Sept. 20, 1938.  C. E. KINGSLEY  2,130,957
WINDSHIELD WIPER
Filed Sept. 7, 1937  2 Sheets-Sheet 1
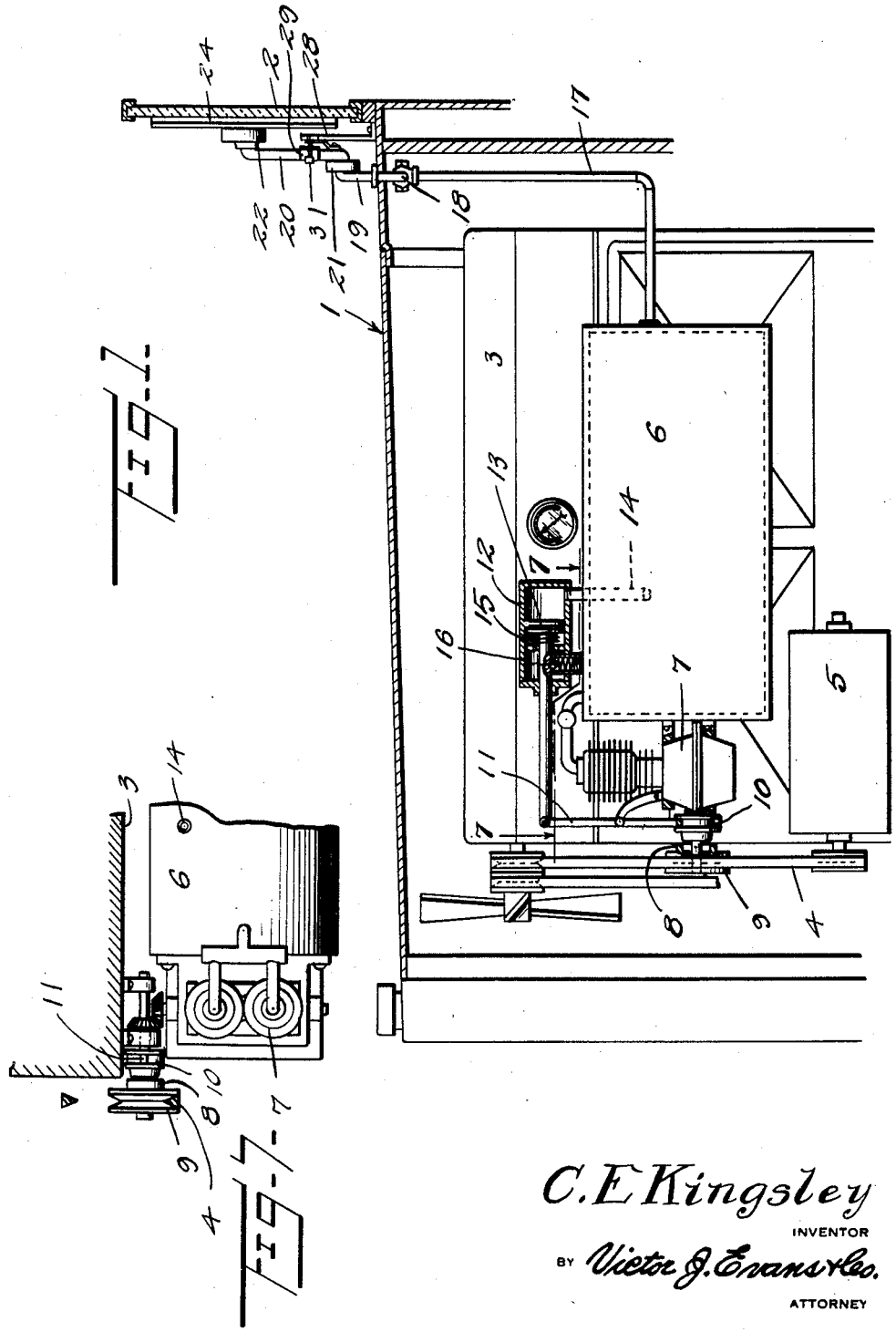
C. E. Kingsley
INVENTOR
BY Victor J. Evans & Co.
ATTORNEY Sept. 20, 1938.   C. E. KINGSLEY   2,130,957
WINDSHIELD WIPER
Filed Sept. 7, 1937   2 Sheets-Sheet 2
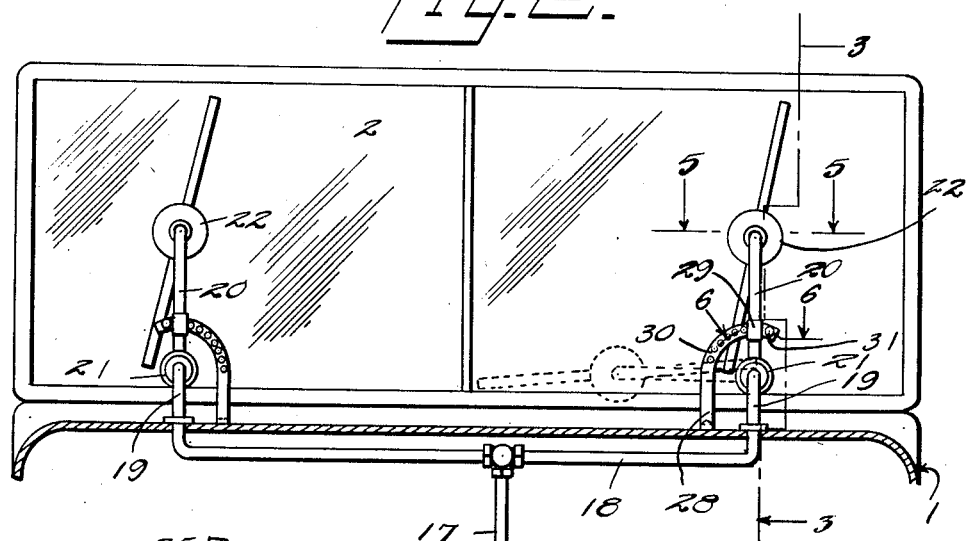
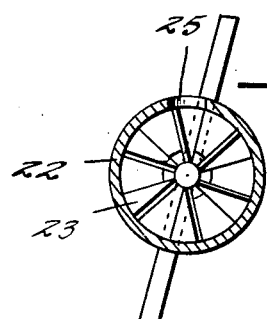
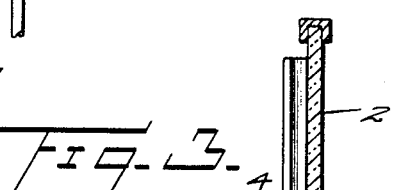
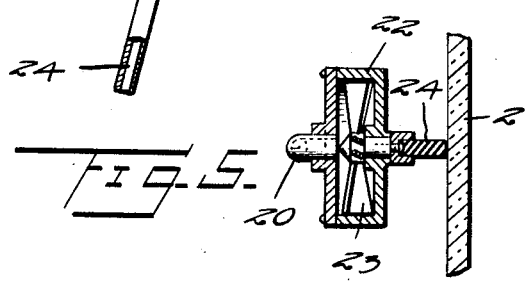
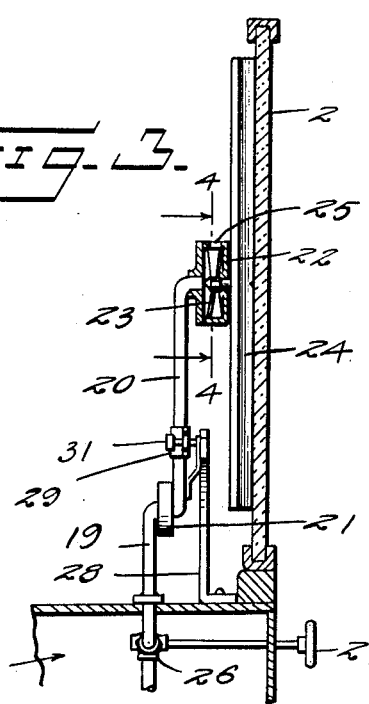
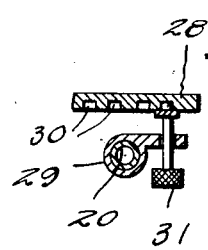
C. E. Kingsley
INVENTOR
BY Victor J. Evans & Co.
ATTORNEY Patented Sept. 20, 1938

2,130,957

UNITED STATES PATENT OFFICE 2,130,957

WINDSHIELD WIPER

Carl E. Kingsley, Newport, Oreg.

Application September 7, 1937, Serial No. 162,734

1 Claim. (Cl. 15—250)

The invention relates to windshield wipers for motor vehicles and has for the primary object the provision of a pneumatically actuated device of this character wherein the wiping elements when in operation will maintain a substantially constant speed and will not be varied in speed by the varying loads on the engine of the motor vehicle and will have a rotating wiping action on the glass of the windshield to remove rain, snow and the like therefrom.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view showing a portion of a motor vehicle with a windshield wiper adapted thereto and constructed in accordance with this invention.

Figure 2 is a transverse sectional view showing the means of adjusting the wiping elements into and out of operative position with respect to the windshield.

Figure 3 is a sectional view taken on the line 3—3 of Figure 2.

Figure 4 is a detail sectional view taken on the line 4—4 of Figure 3.

Figure 5 is a detail sectional view taken on the line 5—5 of Figure 2.

Figure 6 is a detail sectional view taken on the line 6—6 of Figure 2.

Figure 7 is a detail sectional view taken on the line 7—7 of Figure 1.

Referring in detail to the drawings, the numeral 1 indicates a part of a motor vehicle 2, the windshield of the latter, 3 the engine having an endless belt 4 for driving the generator 5 of the engine. The brief description of these parts of the engine is given for the purpose of setting forth clearly the application of my invention on the motor vehicle.

Mounted on the side of the engine 3 is a compressed air tank 6 to which is connected an air compressor 7. The compressor 7 is equipped with a clutch 8 including a pulley 9 engaged by the endless belt 4 and a shiftable element 10 engaged by a pivotally mounted lever 11. A cylinder 12 is mounted on the tank 6 and has slidable therein a piston 13, the stem of which is pivotally connected to the lever 11. The cylinder 12 is connected to the tank 6 by a pipe 14 to permit the air pressure within the tank to act on the piston 13 for urging the piston in one direction. The piston is urged in an opposite direction by a spring 15. A spring pressed ball type catch 16 rides against the stem of the piston 13 and said stem has a notch for the catch to engage. The catch engaging in the notch will hold the piston 13 against sliding movement under the influence of the air pressure until said air pressure reaches a predetermined amount. The air pressure then acts to shift the piston 13 to the left in Figure 1 and render the clutch 8 inoperative. When the piston 13 is urged in an opposite direction and permitted to move in said direction by a decrease in the amount of air pressure, the catch engages in the notch and the clutch 8 becomes inoperative so that the compressor will be driven by the engine 3 to build up the air pressure in the tank 6.

A pipe 17 is connected to the tank 6 and extends to a point adjacent the windshield 2 and has connected thereto oppositely extending branch pipes 18 each including sections 19 and 20. The sections 19 and 20 are rotatably connected, as shown at 21, and the sections 20 of said pipes 18 are connected to rotary air motors 22. The air motors are supported by the sections 20 of the pipes 18 and include rotors 23 to which are connected wiper elements 24. The wiper elements contact the glass of the windshield. Exhaust ports 25 are provided for the air motors. A control valve 26 is located in the pipe 17 and has a handle 27 extending through the instrument board of the motor vehicle so that the operator can open and close the pipe 17. With the valve 26 in an open position air escapes from the tank 6 and acts upon the rotors thereby rotating the wiping elements. The wiping elements rotating against the glass of the windshield remove from said glass, rain, snow and the like.

Curved brackets 28 are secured to the motor vehicle adjacent the windshield and are slidably received in clips 29 secured to the sections 20 of the pipes 18. The brackets have a series of openings 30 and slidable pins 31 are carried by the clips to enter any of the openings whereby the wiping elements may be temporarily secured in various adjusted positions. The device when in use, the wiping elements are positioned as shown in full lines in Figure 2 with respect to the glass of the windshield. However, when the wiping elements are not desired, by releasing the pins 31 from the brackets 28 the wiping element and the sections 20 of the pipes 18 may be caused to assume dotted line position, as shown in Figure 2, thereby placing the wiping elements out of the range of vision of the driver of the motor vehicle.

A device of the character described is economical to maintain in operation and will efficiently clean the glass of the windshield and the speed of rotation of the wiping elements will be constant while in operation due to the fact that the air motors are driven from air pressure derived from a supply tank, the latter being replenished by the compressor driven by the engine of the motor vehicle.

What is claimed is:

In a windshield wiper assembly, a pneumatic means supply pipe adapted to be fixed to a motor vehicle and having an end section extending adjacent to and exteriorly of the windshield of said vehicle, a second pipe having an end section pivotally connected to said end section of said first mentioned pipe and adjustable relative to the latter and said windshield, a motor mounted on the opposite end section of said second mentioned pipe and adapted to be rotatably actuated by pneumatic means functioning through said pipes, a squeegee connected to said motor for rotation thereby over the exterior face of said windshield to effect wiping of a predetermined area of the latter, a bracket adapted to be mounted on said motor vehicle adjacent said windshield and formed with an arcuate shaped upper portion fashioned with a plurality of spaced openings, a clip secured to said second mentioned pipe, and a pin slidably mounted in said clip and extending through one of said openings for maintaining said second mentioned pipe in adjusted position relative to said windshield, said pin operable for engagement with other of said openings whereby to adjust said squeegee for rotation over other areas of said face.

CARL E. KINGSLEY.